(12) United States Patent
Hofmann et al.

(10) Patent No.: US 9,565,032 B2
(45) Date of Patent: Feb. 7, 2017

(54) MONITORING AND CONTROLLING BUS RING PERFORMANCE

(71) Applicant: QUALCOMM Incorporated, San Diego, CA (US)

(72) Inventors: Richard Gerard Hofmann, Cary, NC (US); Ryan Wells, Raleigh, NC (US); Vijay Nagaraj, Cary, NC (US); Prudhvi Nadh Nooney, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 14/559,429

(22) Filed: Dec. 3, 2014

(65) Prior Publication Data
US 2016/0164698 A1 Jun. 9, 2016

(51) Int. Cl.
H04L 12/26 (2006.01)
H04L 12/40 (2006.01)
H04L 12/423 (2006.01)

(52) U.S. Cl.
CPC ......... H04L 12/4013 (2013.01); H04L 12/423 (2013.01); H04L 43/16 (2013.01)

(58) Field of Classification Search
CPC ..... H04L 12/423; H04L 12/4013; H04L 43/16
USPC .............. 370/229–238.1, 250–253, 257–258
See application file for complete search history.

(56) References Cited

U.S. PATENT DOCUMENTS

| 4,393,470 A * | 7/1983 | Miard | G06F 13/24 710/15 |
| 5,132,964 A * | 7/1992 | Esaki | H04L 47/10 370/418 |
| 5,287,357 A * | 2/1994 | Tanaka | H04L 43/16 370/452 |
| 5,677,910 A * | 10/1997 | Delaney | H04L 12/4625 370/402 |
| 6,072,804 A | 6/2000 | Beyers, Jr. | |
| 7,472,293 B2 | 12/2008 | Kuhlmann et al. | |
| 7,773,602 B2 * | 8/2010 | Blanc | H04L 12/5693 370/252 |

(Continued)

FOREIGN PATENT DOCUMENTS

GB 2226737 A 7/1990
WO 2010150945 A1 12/2010

OTHER PUBLICATIONS

International Search Report and Written Opinion—PCT/US2015/059039—ISA/EPO—Feb. 2, 2016.

Primary Examiner — Thai Hoang
(74) Attorney, Agent, or Firm — Muncy, Geissler, Olds & Lowe, P.C.

(57) ABSTRACT

Systems and methods for relate to bus ring performance monitoring and control. A bus ring includes an agent and a switch unit to connect the agent to the bus ring. The switch unit includes a transmit queue to store data from the bus ring to be transmitted to the agent and a receive queue to store data from the agent to be transmitted to the bus ring. A first counter is implemented to track a number of pending transactions in the transmit queue and a second counter is implemented to track a number of times the receive queue is full and unable to accept additional data. Frequency of the bus ring is increased or decreased based on comparison of values of the first counter and the second counter with corresponding predefined high and low threshold values.

30 Claims, 6 Drawing Sheets

(56) References Cited

U.S. PATENT DOCUMENTS

| | | | |
|---|---|---|---|
| 7,881,303 B2* | 2/2011 | Hughes | H04L 1/0007 370/229 |
| 8,004,966 B2 | 8/2011 | Koch et al. | |
| 2003/0133466 A1* | 7/2003 | Shimonishi | H04L 12/5693 370/412 |
| 2008/0089363 A1 | 4/2008 | Paulitsch et al. | |
| 2010/0091748 A1* | 4/2010 | Endoh | H04L 29/06027 370/338 |
| 2010/0172348 A1* | 7/2010 | Saito | H04L 47/6255 370/389 |
| 2010/0312874 A1 | 12/2010 | Jansen et al. | |
| 2012/0155268 A1* | 6/2012 | Ohshio | H04L 47/12 370/235 |
| 2012/0163218 A1* | 6/2012 | Kim | H04W 74/08 370/252 |
| 2012/0198266 A1 | 8/2012 | Hofmann et al. | |
| 2013/0166701 A1 | 6/2013 | Todorov et al. | |
| 2014/0115221 A1 | 4/2014 | Ganasan et al. | |

* cited by examiner

MONITORING AND CONTROLLING BUS RING PERFORMANCE

FIELD OF DISCLOSURE

Disclosed aspects are directed to bus ring performance monitoring and control. More specifically, exemplary aspects are directed to increasing or decreasing bus ring frequency based on statuses of agents connected to the bus ring through switch units.

BACKGROUND

A bus ring architecture includes a network topology in which data travels around a network ring. A plurality of agents are connected to the bus ring through switch units. Each agent can receive/transmit data around the ring through the switch units, where the switch units can also be used as repeaters for data flowing through the ring. The amount of data traffic that can flow through the bus ring at any time is limited by parameters such as the maximum bandwidth and frequency of the bus ring. Performance of the bus ring is said to be high when more data traffic can flow through the bus ring. However, high performance may mean that power consumption is increased, because higher frequency of operation leads to more power consumed by the bus ring. Thus, balancing performance and power consumption is a recognized design challenge for bus rings.

The agents connected to the bus ring can include processors (e.g., central processing units (CPUs), digital signal processors (DSPs), etc.), memory controllers, memory devices such as caches (e.g., L2, L3 caches), peripheral bridges, etc. The agents may have varying requirements and may influence the traffic on the bus rings differently. However, conventional bus ring designs take the overall bus ring traffic and frequency into account while trying to modulate performance of the bus ring and minimize power consumption. The conventional designs seek to reduce power consumption by slowing down the bus ring clock frequency and/or lowering the voltage of the bus ring circuits based on metrics such as average traffic in the bus ring. However, metrics related to the overall frequency or traffic of the bus ring are misleading because these metrics do not correlate well with the performance or needs of individual agents. Some agents may be stalled or starved while other agents may over-utilize the bus ring's resources. Lowering the frequency of the bus ring based on average traffic may further degrade the performance of the stalled agents. Conventional designs do not monitor the interfaces of individual agents (or more specifically, the interfaces of switch units) to determine if the performance requirements of the individual agents are satisfied. Moreover, in conventional designs, changes in the bus ring frequency are not based on concurrence of all agents, which may, for example, lead to depriving a starved agent from an opportunity to prevent further starvation that may be caused by a lowering of the bus ring frequency.

Accordingly, there is a need for improved performance monitoring to achieve reduced power consumption and increased efficiency of traffic flow in bus ring designs.

SUMMARY

Exemplary aspects are directed to bus ring performance monitoring and control. More specifically, exemplary aspects relate to increasing or decreasing bus ring frequency based on statuses of agents connected to the bus ring through switch units.

For example, an exemplary aspect relates to an apparatus comprising a bus ring, an agent, and a switch unit configured to connect the agent to the bus ring. The switch unit comprises a transmit queue to store data from the bus ring to be transmitted to the agent and a receive queue to store data from the agent to be transmitted to the bus ring. A first counter is configured to track a number of pending transactions in the transmit queue due to lack of availability of a transmit token and a second counter is configured to track a number of times the receive queue is full and unable to accept additional data. Frequency of the bus ring is configured to be increased or decreased based on values of the first counter and the second counter.

Another exemplary aspect relates to method of adjusting frequency of a bus ring, the method comprising connecting an agent to the bus ring using a switch unit. The method includes storing data from the bus ring to be transmitted to the agent in a transmit queue of the switch unit and storing data from the agent to be transmitted to the bus ring in a receive queue of the switch unit. A number of pending transactions in the transmit queue due to lack of availability of a transmit token is tracked using a first counter. A number of times the receive queue is full and unable to accept additional data is tracked using a second counter. Increasing or decreasing the frequency of the bus ring is based on values of the first counter and the second counter.

Yet another exemplary aspect relates to a system comprising an agent connected to a bus ring using a switch unit. The system includes first means for storing data from the bus ring to be transmitted to the agent in the switch unit and second means for storing data from the agent to be transmitted to the bus ring in the switch unit. The system further includes a first means for tracking a number of pending transactions in the first means for storing, a second means for tracking a number of times the second means is full, and means for increasing or decreasing the frequency of the bus ring based on values of the first and second means for tracking.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
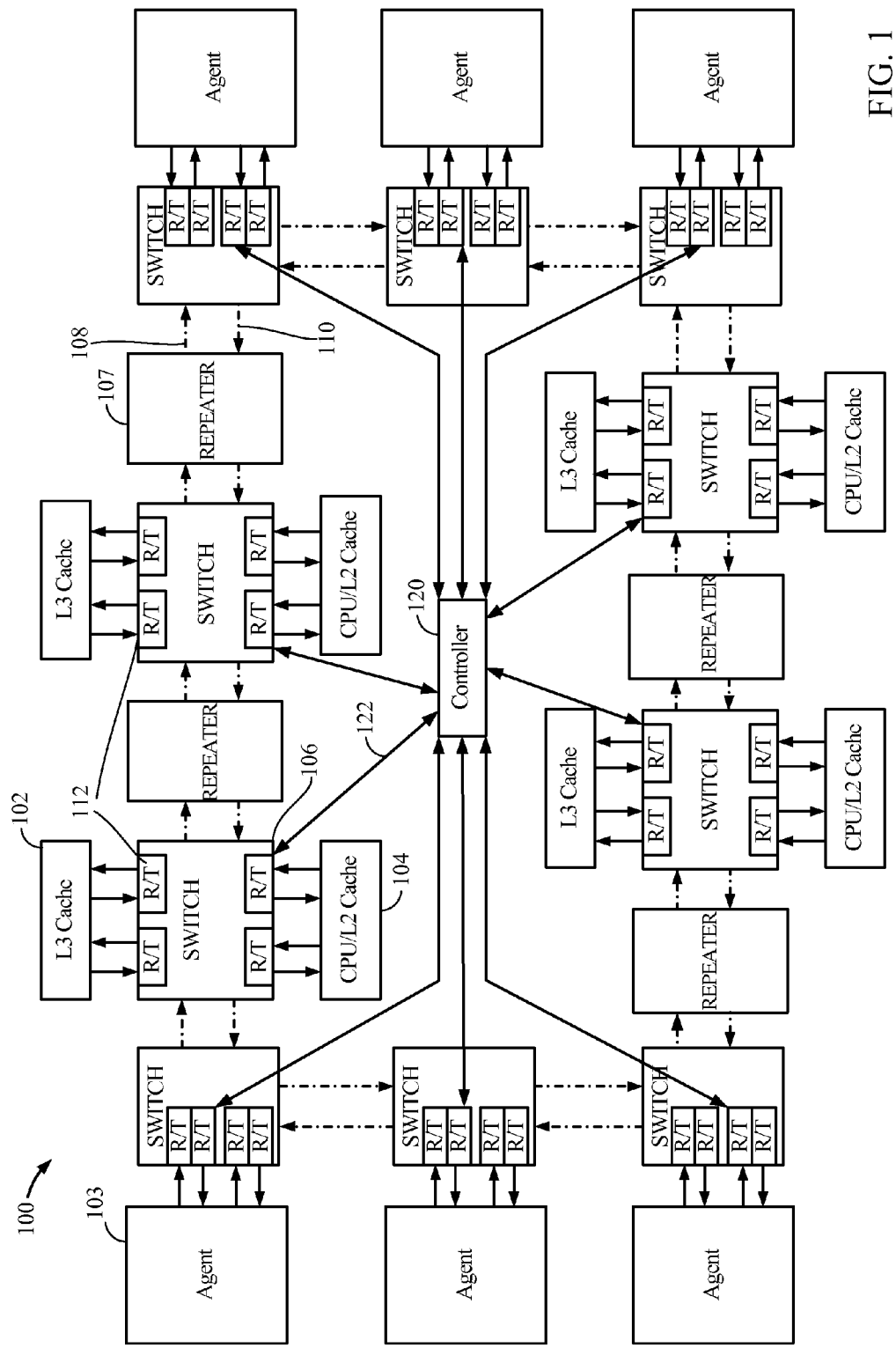
FIG. 1 illustrates a bus ring system according to aspects of this disclosure.

Aspects of the invention are disclosed in the following description and related drawings directed to specific embodiments of the invention. Alternative embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As previously described, conventional designs for bus rings rely on metrics such as average or peak traffic pertaining to the entire bus ring for making determinations regarding frequency and voltage scaling in an effort to reduce power consumption. These metrics do not take into account the characteristics and patterns related to individual agents. For example, monitoring traffic around the bus ring may indicate whether an empty traffic slot existed, wherein there was no traffic flow around the bus ring during a time period or time slot. However, indications of empty traffic slots, if any, do not accurately convey that bus ring frequency can be altered (e.g., increased to fill up data traffic in the empty traffic slots).

On the other hand, exemplary aspects relate to monitoring the latency requirements of individual agents and basing decisions for increasing or decreasing bus ring frequency in a manner which is cognizant of the requirements of all the agents connected to the bus ring.

Accordingly, in aspects of this disclosure, exemplary switch units are described. The agents may be connected to the bus ring through switch units. According to one or more aspects, a switch unit may be provided to an agent or some switch units may be shared amongst two or more agents and moreover, a single agent may interface with a switch unit through two or more channels. The perspective of the switch unit will be employed in discussing data flow between the agent and the bus ring. Thus, a switch unit receives data from the bus ring and transmits the data to the agent through a transmit channel. Further, the switch unit receives data from an agent through a receive channel and transmits the data to the bus ring. Correspondingly, the switch unit maintains a transmit queue or a first means for storing data to be transmitted to the agent through the transmit channel and a receive queue or a second means for storing data received from the agent through the receive channel. In some aspects, the switch unit may have two or more receive channels and/or transmit channels and corresponding receive/transmit queues. For the sake of simplicity of explanation, one receive channel and one transmit channel and corresponding receive queue and transmit queue will be the main focus in the following sections.

In one aspect, counters are provided for the transmit and receive queues in the switch unit for a corresponding agent. More specifically, a transmit counter is provided for the transmit queue and a receive counter is provided for the receive queue. The transmit counter or a first means for tracking a number of pending transactions in the transmit queue is incremented every time data is present in the transmit queue but cannot be transmitted to the agent, for example, due to the lack of availability of transmit tokens for the agent. A predetermined number of transmit tokens may be made available to an agent. Alternatively, the transmit tokens may be provided by an external device such as a central monitor which will be further explained in following sections. The receive counter or a second means for tracking a number of times the receive queue is full, is incremented every time the receive queue is full and the switch unit cannot accept any more data from the agent. The transmit and receive counters for an agent may be implemented in a switch unit through which the agent connects to the bus ring.

The transmit and receive counters for an agent indicate how much the flow of traffic to and from the corresponding agent is inhibited. Thus, the transmit and receive counters provide an indication of an amount of bus ring frequency increase which will ease the blockage, or alternatively, how much the bus ring frequency can be decreased without deteriorating the agent's traffic requirements or needs. Thus, decisions to increase or decrease the bus ring's frequency, for example, to monitor and control power consumption, may be based on these counters.

In exemplary aspects, high and low thresholds may be established (e.g., in a programmable manner) for the transmit and receive counters of agents connected to the bus ring. When it comes to increasing frequency, a logical "OR" function of counter values is applicable, wherein if any one of the plurality of agents' transmit or receive counter exceeds a corresponding high threshold, the bus ring frequency may be increased. On the other hand, when it comes to decreasing the bus ring frequency, a logical "AND" function may be applicable, wherein transmit and receive counters for all the agents must fall below the low threshold, to permit decrease in the bus ring frequency. The low threshold may be a pre-programmed level or floor which may be configured to ensure that none of the agents get unacceptably inhibited.

With reference now to FIG. 1, an exemplary bus ring 100 is depicted. FIG. 1 shows numerous agents connected to a ring network through switch units. Selected ones of these agents and switch units are specifically labeled for illustrative purposes. For example, the agent 102 includes an L3 cache and agent 104 includes a processor such as a central processing unit (CPU) and a corresponding L2 cache. Agent 103 can be any other agent such as a bridge unit, a direct memory access (DMA) controller, memory controller, etc. Agents 102, 103, 104 can be connected to the ring network through switch units (SUs) such as switch unit 106. As illustrated, two or more agents such as agents 102 and 104 can be connected to the same switch unit 106. Switch units 106 correspondingly include receive/transmit queues, shown as "R/T" 112, for each agent (or in some cases, two or more such receive/transmit queues for each agent if there are corresponding two or more channels). Repeaters 107 may not be connected to any agent but may be used to facilitate traffic flow between switch units 106, which may be at a high bus ring frequency. Repeaters 107 may capture the signaling related to data traffic between switch units 106 and re-transmit them in order to maintain signal strength and quality as wires of bus ring 100 traverse long distances on a silicon die or system on which bus ring 100 may be integrated. Bus ring 100 includes first ring network 108 in a clockwise direction and second ring network 110 in a counter-clockwise direction. Although an example implementation is shown in FIG. 1, it will be understood that additional or fewer ring networks, agents, switches, etc., than those illustrated in FIG. 1 may be present in bus ring 100 without departing from the scope of this disclosure.

According to an exemplary aspect, ring frequency controller 120 is a central manager or controller which is used to monitor and control increase and decrease of the ring frequency of bus ring 100. Receive/transmit queues 112 of the agents (implemented in their corresponding switch units 106) are synchronized to a central time, which will be referred to as a bus ring time based on a bus ring clock (not explicitly shown) of bus ring 100. A synchronized event measurement interval is developed and provided to switch units 106. Ring frequency controller 120 can be used to consolidate the various traffic requirements of each agent and to communicate ring frequency increase/decrease commands to switch units 106. These communications to/from ring frequency controller 120 are conceptually shown as bidirectional communication paths 122 in FIG. 1, but it will be understood that such communications paths 122 need not be implemented as dedicated wires, but may be implemented through shared wires or buses based on particular implementations of bus ring 100.

As previously described, the receive/transmit queues 112 have corresponding counters. As mentioned, two or more receive/transmit channels may be present between a switch unit 106 and corresponding agent 102/103/104 (for example, two pairs of receive/transmit channels may correspond to receive/transmit channels for each of first ring network 108 and second ring network 110). Respective receive/transmit queues 112 may be maintained for each receive/transmit channel. Thus, for a transmit queue, a first counter, which may also be referred to herein as a Transmit Tokens Empty counter is incremented every time a transaction is pending in the transmit queue of the switch unit to be transmitted to an agent, but cannot be transmitted due to the lack of the required transmit token. A second counter, which may also be referred to herein as a Receive Queue Full counter, is incremented every time the receive queue comprising data received from the agent is full.

Threshold values can be determined for the first and second counters based on one or more performance levels that may be supported by bus ring 100. The counters may be compared to the threshold values, which may be predetermined or pre-programmed threshold values. The comparisons may indicate whether the bus ring frequency needs to be increased (e.g., to meet one or more individual agent's needs), whether the bus ring frequency can be decreased (if all the agents can support such a frequency decrease), or if the bus ring frequency is already at desired or optimal performance and power consumption levels.

In an example, the predetermined or pre-programmed threshold levels can be stored in registers. Specifically, a first high threshold can be loaded or programmed in a first high threshold register or a High Threshold Tx Tokens register, which corresponds to an upper limit threshold value for the first counter or Transmit Tokens Empty Counter value. Similarly, a first low threshold can be loaded or programmed in a first low threshold register or a Low Threshold Tx Tokens, which corresponds to a lower limit threshold value for the first counter. Further, a second high threshold can be loaded or programmed in a second high threshold register or a High Threshold Rx Queue Full register, which corresponds to an upper limit threshold value for the second counter or Receive Queue Full Counter value. Similarly, a second low threshold can be loaded or programmed in a second low threshold register or a Low Threshold Rx Queue Full register, which corresponds to a lower limit threshold value for the second counter. Additionally, a measurement interval over which the comparisons are made with the above registers, which is also a programmable value, can be stored in a "measurement interval" register. Comparisons in a current measurement interval may be made based on values of the first and second counters in a previous measurement interval.

In some aspects, monitoring performance at the agents can be initiated based on common performance level selection signaling sent to all the switch units. For example, a register in ring frequency controller 120 can contain an index value which indicates a desired performance level. Ring frequency controller 120 can transmit this index value to the switch units of all the agents (e.g., through communication paths 122). The performance levels may relate, for example, to how the threshold values for the counters must be set at a given bus ring frequency. The index value or desired performance level for a current measurement interval may be determined based on values of the first and second counters (e.g., in relation or comparison to corresponding first and second high and low thresholds set based on a previous index value) in a previous measurement interval.

In an example, for a first performance level, the High Threshold Tx Tokens register value may be set to a high value, which means that an agent will be inhibited only if a large number of transactions are waiting in the agent's transmit queue in its switch unit. On the other hand, for a second performance level, the High Threshold Tx Tokens register value may be set to a lower value, which means that decisions to increase frequency due to the agent being inhibited will be made based on a fewer number of outstanding transactions in the corresponding transmit queue.

The above evaluations/comparisons for the specified index value may be synchronized to the bus ring frequency in all the agents. Comparing the counters to the corresponding threshold values for selected performance levels can act as filtering mechanisms for filtering out traffic spikes and dips across agents in bus ring 100. For example, an agent may be severely inhibited with a very large spike in transmit or receive channel traffic during a particular measurement interval, but by setting the threshold value for comparison, the decisions to raise or lower ring frequency can filter out these spikes by averaging of the total Transmit Tokens Empty and Receive Queue Full counts during the entire measurement interval.

When switch units 106 detect a change in the index value, e.g., if a new index value is received from ring frequency controller 120, switch units 106 may terminate their current window or measurement interval and restart the process of comparison with performance level based threshold values using the new index value. The index value includes an indication of a set of values including a duration of a measurement interval and high and low thresholds for the first and second counters. For example, the index value may indicate a first set of values comprising a first high threshold and a first low threshold for the first counter and a second high threshold and a second low threshold for the second counter. The index value can indicate that the first set is to be selected from two or more such sets of values.

Figure 2:
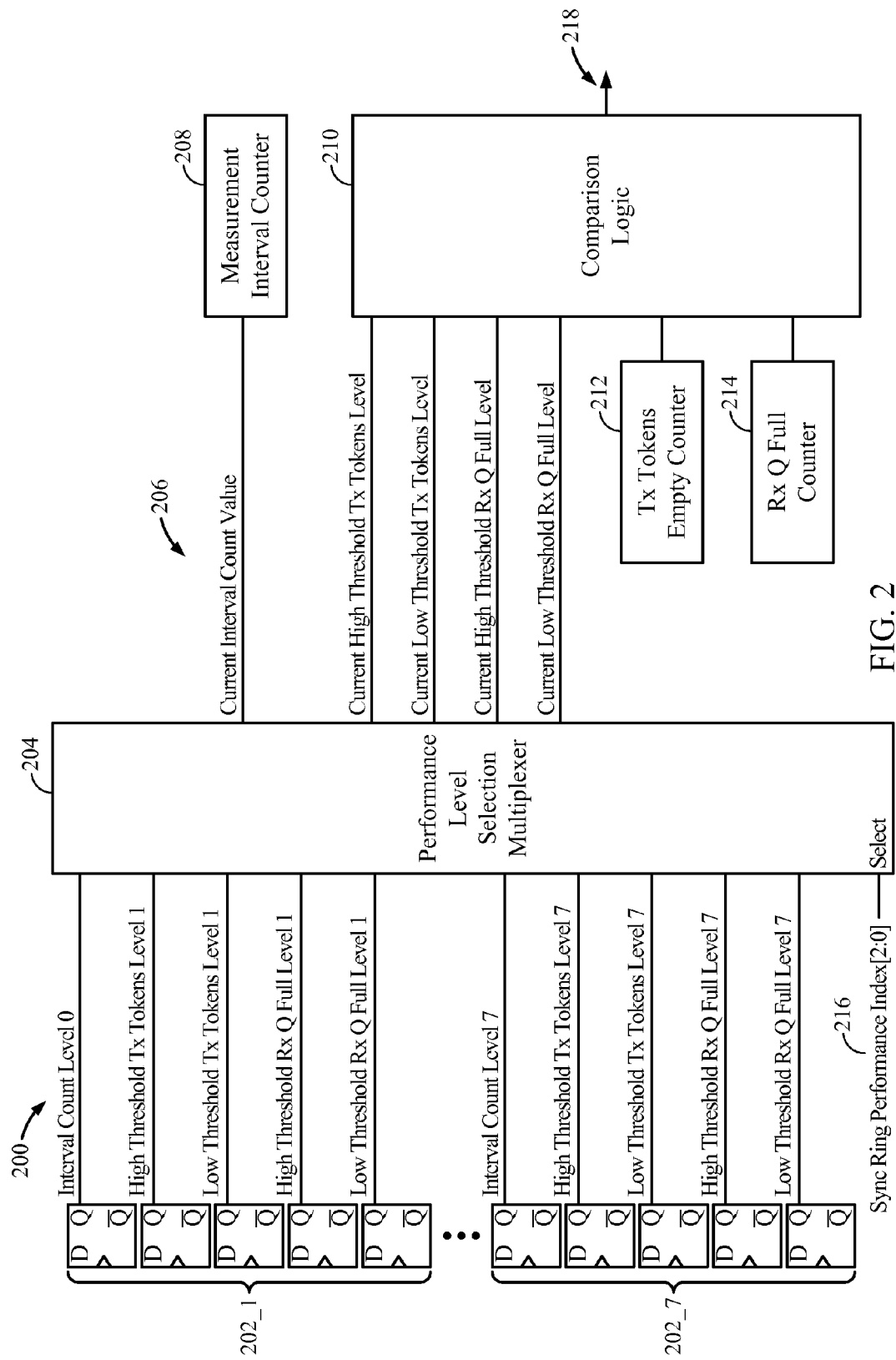
FIG. 2 illustrates logic for a switch unit configured to interface an agent to the bus ring system of FIG. 1, according to exemplary aspects.

With reference to FIG. 2, the above-described process can be implemented in block 200, which may be integrated in the switch units, such as switch unit 106 in connection with agents 102-104, as discussed above. In a non-limiting example, a 3-bit index value, Sync Ring Performance Index [2:0] 216 is generated in switch unit 106 by locally synchronizing the index value received from ring frequency controller 120 (e.g., by passing the index value through a sequence of two or more registers or by other forms of synchronization to local frequency as known in the art). The index value can have any number of bits and corresponding number of performance levels without departing from the scope of this disclosure. The example of a 3-bit index value will be discussed in further detail below.

A predetermined value of the index value may be used to disable logic and functions related to determination of increasing or decreasing the bus frequency based on the first and second counters of the switch unit during the current measurement interval. For example, a "000" value for Sync Ring Performance Index [2:0] 216 may indicate a control signal to disable the measurement interval, the first and second counters, threshold comparisons, and de-assert any signaling whether corresponding threshold values have been exceeded, during a particular measurement interval. The remaining seven binary values of Sync Ring Performance Index [2:0] 216 can correspond to respective seven sets of thresholds and measurement intervals which can be selected by the multiplexor, performance level selection mux 204 using Sync Ring Performance Index [2:0] 216 as a selection control signal. These seven sets are representatively shown by set 202_1 and 202_7, with sets 202_2 through 202_6 not explicitly shown. The selected output of performance level selection mux 204 includes the output signal set 206, which includes the selected measurement interval, a selected first high threshold or Current High Threshold Tx Tokens Level, a selected first low threshold or Current Low Threshold Tx Tokens Level, a selected second high threshold or Current High Threshold Rx Queue Full Level, and a selected second low threshold or Current Low Threshold Rx Queue Full Level. The selected measurement interval from set 206 is stored in a register which is used for implementing measurement interval counter (MIC) 208. The first and second counters are compared with the respective selected first and second high and low thresholds respectively in comparison logic 210 to generate output 218 which indicates whether any of the high/low threshold values have been exceeded (it will be understood that as used herein, "exceed" the high/low thresholds means that in the case of the high threshold, the count value is higher than the high threshold and in the case of the low threshold, that the count value is lower than a low threshold).

Figure 3:
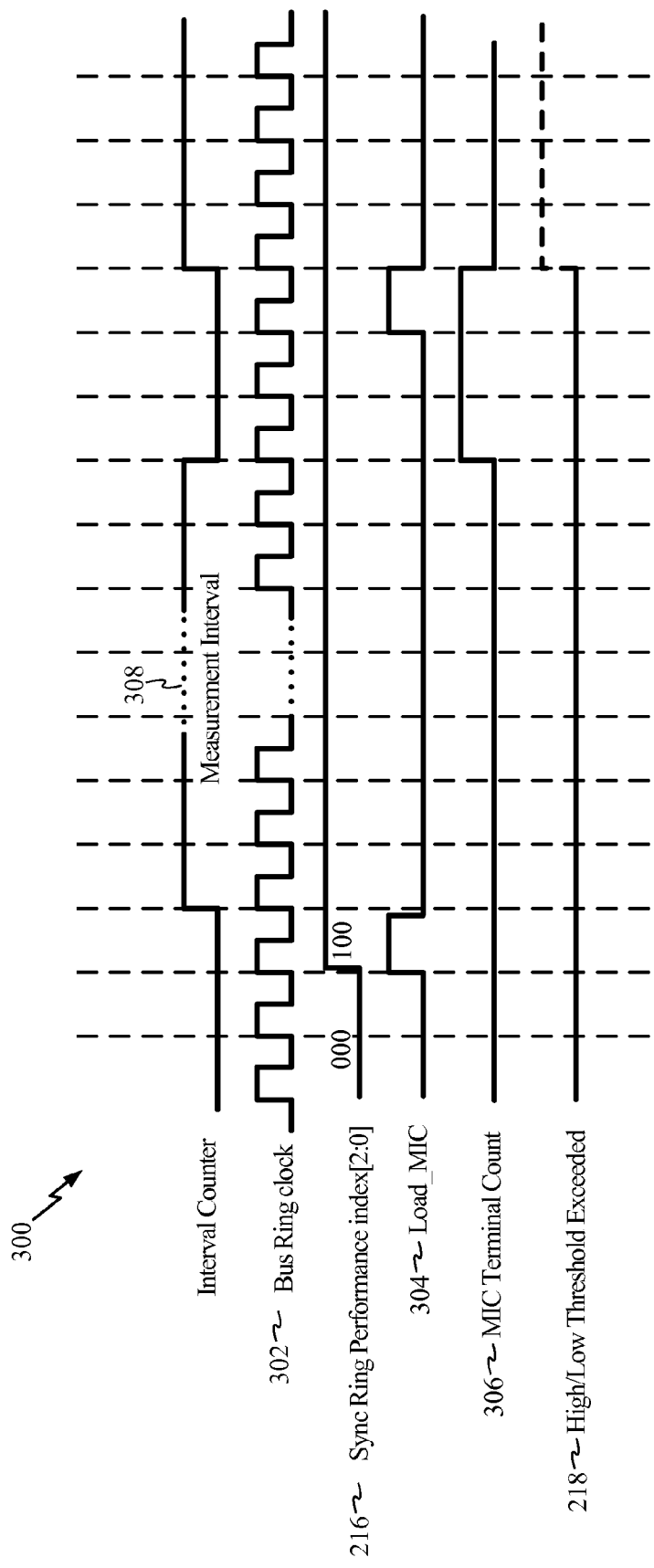
FIG. 3 illustrates a timing diagram for the logic of FIG. 2.

With reference now to FIG. 3, timing diagram 300 is shown pertaining to the processes related to comparison of the thresholds in block 200 described above. As previously noted, all the blocks similar to block 200 which are implemented in the various switch units of bus ring 100, can be operated under the same or common clock corresponding to the bus ring frequency. This common clock is shown as Bus Ring Clock 302. The first and second counters, Transmit Tokens Empty Counter 212 and Receive Queue Full Counter 214 respectively, can be reset at the start of the measurement interval, when the signal to load the value from Current Interval Count Value Load_MIC 304 is asserted. The signal Load_MIC 304 is asserted when a new Sync Ring Performance Index [2:0] 216 is received from ring frequency controller 120. Following this, the selected Measurement Interval 308 is loaded into the register for MIC 208 from the output of performance level selection mux 204 and is active until MIC Terminal Count 306 is asserted, signifying the end of the current Measurement Interval 308.

During Measurement Interval 308, Transmit Tokens Empty Counter 212 and Receive Queue Full Counter 214, are updated or incremented based on the corresponding transmit and receive queues (e.g., based on outstanding transactions, as previously noted). These counter values are updated throughout Measurement Interval 308. At the end of Measurement Interval 308, comparison logic 210 is used to compare the counter values with corresponding threshold values. Several cycles may be consumed by comparison logic 210 before output 218 (which indicates whether any of the high/low threshold values have been exceeded) becomes available. The results of the comparison during Measurement Interval 308 will be valid and applicable during the entire subsequent measurement interval, the start of which can be triggered by Load_MIC 304 transitioning to a high value again. In this manner, the decisions to update the bus ring frequency can be dynamically made during each measurement interval, based, for example, on the comparison results obtained during a previous measurement interval. The capability to dynamically update the bus ring frequency in this manner provides flexibility in terms of synchronization of the various switch units 106 to the bus ring frequency.

Figure 4:
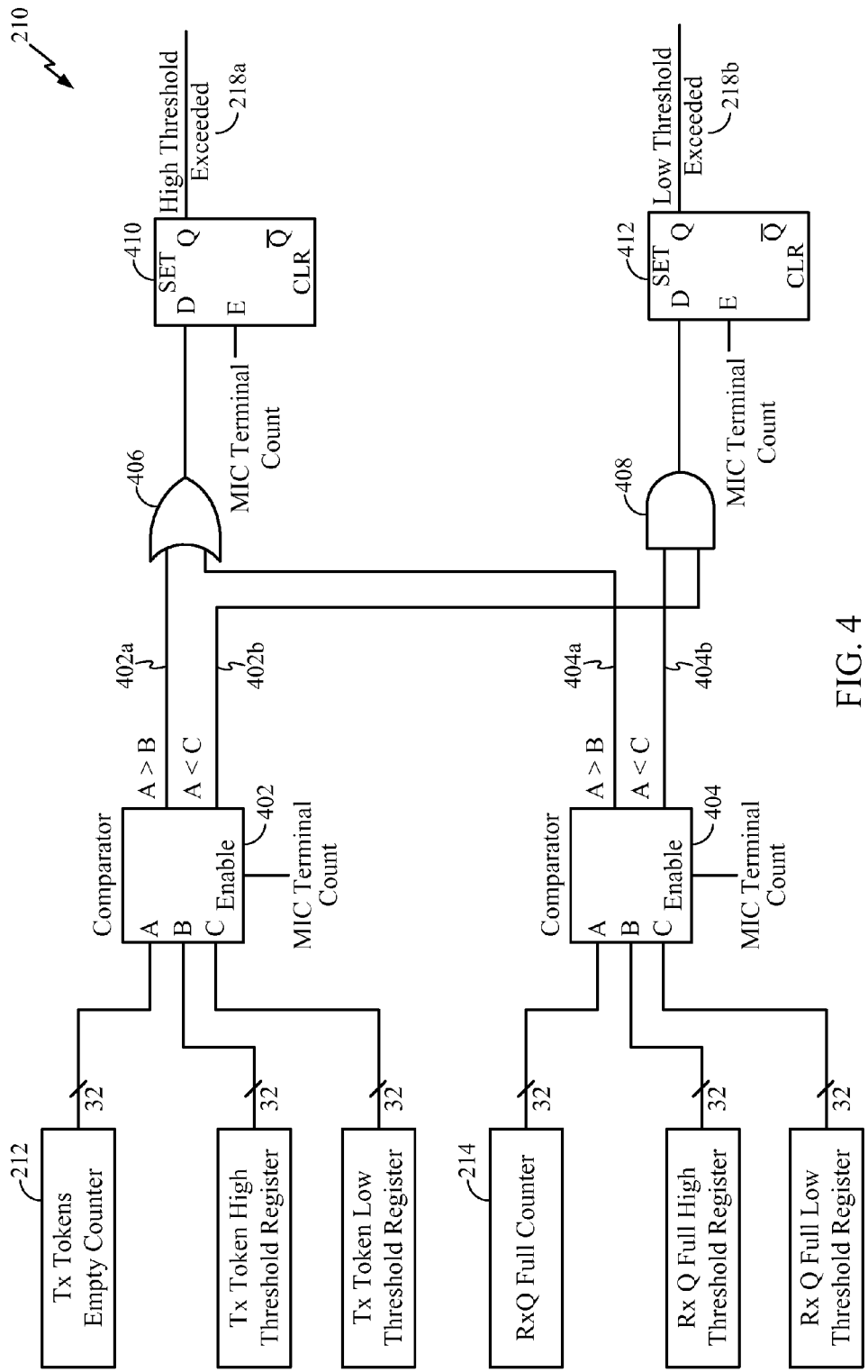
FIG. 4 illustrates an expanded view of a comparison block illustrated in FIG. 2 with the timing diagram illustrated in FIG. 3.

With combined reference to FIGS. 2-4, a detailed view of comparison logic 210 along with its corresponding timing diagram will now be described. As shown in FIG. 4, comparators 402 and 404 are provided in comparison logic 210. Comparator 402 receives Transmit Tokens Empty Counter 212, as well as, the high and low threshold levels, Current High Threshold Tx Tokens Level and Current Low Threshold Tx Tokens Level, obtained from the output set 206. Comparator 402 is enabled once MIC Terminal Count 306 is asserted at the end of Measurement Interval 308 (see FIG. 3). Once enabled, output 402a of comparator 402 transitions to a high value (or a logical "1" in binary notation) when Transmit Tokens Empty Counter 212 is greater than the Current High Threshold Tx Tokens Level, which signifies that from the perspective of block 200 (implemented, for example, within switch unit 106), a bus ring frequency increase will be required in order to reduce the accumulation of outstanding transactions in the corresponding transmit queue. Similarly, output 402b of comparator 402 transitions to a high value when Transmit Tokens Empty Counter 212 is less than the Current Low Threshold Tx Tokens Level, which can signify that a lower bus ring frequency may be acceptable for block 200.

Similarly, comparator 404 accepts Receive Queue Full Counter 214, as well as, the Current High Threshold Rx Queue Full Level and Current Low Threshold Rx Queue Full Level obtained from the output set 206. Comparator 404 is also enabled once MIC Terminal Count 306 is asserted at the end of Measurement Interval 308 (see FIG. 3). Once enabled, comparator 404's output 404a will transition to a high value when Receive Queue Full Counter 214 is greater than the Current High Threshold Rx Queue Full Level, which also signifies that from the perspective of block 200, a bus ring frequency increase will be required in order to reduce the accumulation of transactions in the receive queue in this case. Similarly, comparator 404's output 404b will transition to a high value when Receive Queue Full Counter 214 is less than the Current Low Threshold Rx Queue Full level, which can also signify that for block 200, a lower bus ring frequency may be acceptable.

Based on the above outputs 402a-b and 404a-b of comparators 402 and 404 respectively, combined decisions for output 218 of comparison logic 210 are generated as follows. Output 218 can include two components—High Threshold Exceeded 218a and Low Threshold Exceeded 218b, which will be explained below. Ring frequency controller can implement logic or means for increasing and decreasing the bus ring frequency based on output signals from switch units such as High Threshold Exceeded 218a and Low Threshold Exceeded 218b.

Exceeding the high threshold for either the transmit queue or the receive queue will cause the bus ring frequency to be increased. Thus, OR gate 406 is provided to generate a high (or logical "1") output when either 402a OR 404a are high. The output of OR gate 406 is latched in latch 410, enabled by the signal MIC Terminal Count 306, such that output of latch 410, High Threshold Exceeded 218a, is available during the subsequent measurement interval.

Alternatively, lowering the frequency is only permissible if the low thresholds of both the transmit queue as well as the receive queue are exceeded (i.e., the values of Transmit Tokens Empty Counter 212 and the Receive Queue Full Counter 214 fall below the Current Low Threshold Tx Tokens Level and the Current Low Threshold Rx Queue Full Level respectively). Therefore, AND gate 408 is provided to generate a high (or logical "1") output when 402b AND 404b are high. The output of AND gate 408 is latched in latch 412, enabled by the signal MIC Terminal Count 306, such that output of latch 412, Low Threshold Exceeded 218b, is available during the subsequent measurement interval.

While the above explanation shows how exceeding the high/low threshold may affect decisions pertaining to a single switch unit, similar logic is extended across the two or more switch units connected to the various agents of bus ring 100. In more detail, ring frequency controller 120 may be configured to increase the frequency of bus ring 100 if a high threshold level of any one of the two or more switch units is exceeded. Similarly ring frequency controller 120 may be configured to decrease the frequency of bus ring 100 if a low threshold of all of the two or more switch units is exceeded. For example, if the output High Threshold Exceeded 218a of any switch unit is high, then a frequency increase for bus ring 100 is mandated. On the other hand, only if the output Low Threshold Exceeded 218b is high for all switch units, is a decision to decrease frequency of bus ring 100 possible.

The above decisions for increasing/decreasing frequency can be dynamically updated following each measurement interval, based on a new performance index level provided in a previous measurement interval, for example. In some cases, voltage of the bus ring can be increased/decreased correspondingly instead of or in addition to increasing/decreasing frequency respectively, based on similar factors as discussed above for increasing/decreasing frequency.

Figure 5:
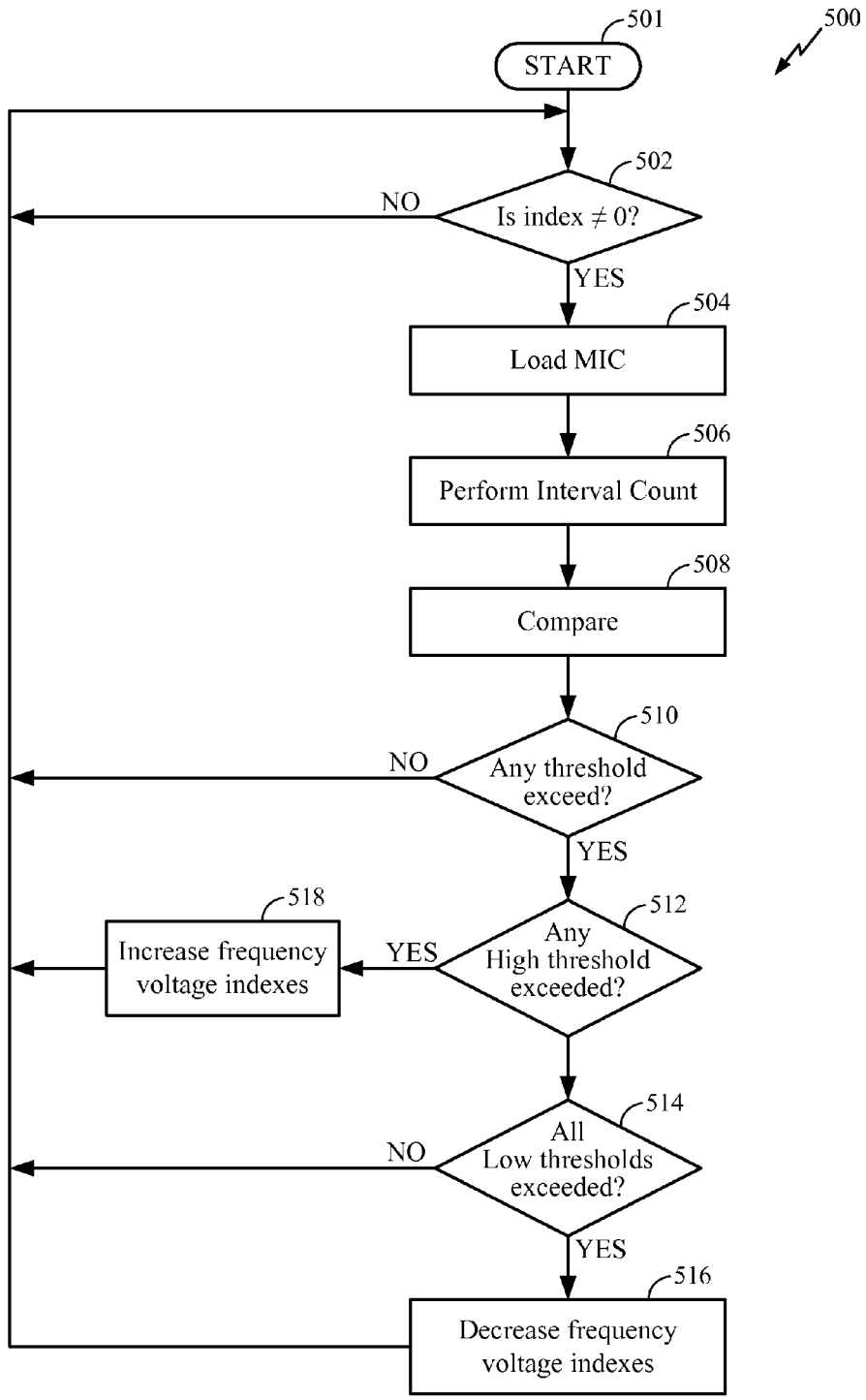
FIG. 5 illustrates a flow chart for an example of a method of increasing or decreasing bus ring frequency in a bus ring system according to disclosed aspects.

With reference now to FIG. 5, an exemplary flow diagram according to exemplary aspects discussed above is illustrated. As shown, method 500 (implemented, for example, in block 200 of FIG. 2) starts at Block 501, where Transmit Tokens Empty Counter 212 and Receive Queue Full Counter 214, as well as, High Threshold Exceeded 218a and Low Threshold Exceeded 218b may be reset or initialized. Proceeding to Block 502, the value of the index received from ring frequency controller 120 and synchronized to Sync Ring Performance Index [2:0] 216 is checked. If Sync Ring Performance Index [2:0] 216 is "000," method 500 stays in Block 502, as this corresponds to block 200 being disabled. If Sync Ring Performance Index [2:0] 216 is not "000" but is any value between a decimal value of "1" and "7" corresponding to one of seven performance levels, method 500 proceeds to Block 504.

In Block 504, the signal Load_MIC 304 is asserted and the selected Current Interval Count Value 206 is loaded into the Measurement Interval Counter 208 from the output of Performance Level Selection Multiplexer 204. In Block 506, values of Transmit Token Empty Counter 212 and Receive Queue Full Counter 214 are determined while Measurement Interval 308 is active, based on the corresponding transmit and receive queues. Block 510 is entered once MIC Terminal Count 306 is asserted, signifying the end of the current Measurement Interval 308. In Block 510, it is determined whether values of Transmit Token Empty Counter 212 and Receive Queue Full Counter 214 have exceeded corresponding high/low threshold values. If none of the threshold values were exceeded, then no change to bus ring frequency is effected and method 500 returns to Block 502.

If high/low threshold values are exceeded in Block 510, in Block 512, it is determined whether any high threshold value is exceeded (e.g., based on the signal High Threshold Exceeded 218a of FIG. 4). If the Current High Threshold Tx Tokens Level is exceeded, for example, bus ring frequency is increased in Block 518 and Block 502 can be returned to. If not, method 500 proceeds to Block 514, where it is determined if all low thresholds are exceeded (e.g., based on signal Low Threshold Exceeded 218b of FIG. 4). If all low thresholds (e.g., Current Low Threshold Tx Tokens Level and the Current Low Threshold Rx Queue Full Level for all ring switches) are exceeded then in Block 516, the ring frequency is lowered. On the other hand, if all low thresholds are not exceeded, then method 500 returns to Block 502.

Accordingly, exemplary aspects have been described for monitoring status (e.g., outstanding transactions) of receive/transmit queues pertaining to individual agents rather than focusing on metrics of the bus ring as a whole. Additionally, in the disclosed aspects, values of Transmit Token Empty Counter 212 and Receive Queue Full Counter 214 are monitored for influencing decisions on increasing or decreasing bus ring frequency. Moreover, disclosed aspects allow easy synchronization of all switches with very few wires required, based on the control signals including index signals (e.g., Sync Ring Performance Index [2:0] 216) and measurement intervals (e.g., Measurement Interval 308) that are provided by or derived from ring frequency controller 120. Thus, no handshaking between agents is required. Moreover, since all processes as described above with reference to block 200 are performed with Bus Ring Clock 302, separate clocking of each switch unit for the above-described processes and functions are not required.

With reference once again to the timing diagram of FIG. 3, one or more additional aspects will now be explained. As previously described, several cycles may be consumed by comparison logic 210 before output 218 (which indicates whether any of the high/low threshold values have been exceeded) becomes available. During this time, the comparisons of the threshold values with the first and second counter, Transmit Tokens Empty Counter 212 and Receive Queue Full Counter 214, may have resulted in indications of the high/low threshold values having been exceeded more than one time. In the above discussion, reference were made to High Threshold Exceeded 218a and Low Threshold Exceeded 218b transitioning to high values, based on which bus ring frequency increase/decrease were effected. However, output 218 need not include single bit representations for the component signals High Threshold Exceeded 218a and Low Threshold Exceeded 218b. Rather, output 218 may be composed of one or more bits for each of the component signals to represent a number of times these signals were high during Measurement Interval 308, for example. An indication of the number of clock cycles that these component signals were high during Measurement Interval 308 may be provided to ring frequency controller 120. Thus, output 218 includes a sufficient number of bits for each of the component signals High Threshold Exceeded 218a and Low Threshold Exceeded 218b to represent the number of clock cycles that these signals were high during a measurement interval. In one example, a number of clock cycles that High Threshold Exceeded 218a and Low Threshold Exceeded 218b were high is averaged over the number of clock cycles in the measurement interval and the average number is provided to ring frequency controller 120.

In one implementation, the duration of time of each separate instance that High Threshold Exceeded 218a and Low Threshold Exceeded 218b were high is tracked. The duration of time can be measured by corresponding time interval counters. These time interval counters may count a number of clock cycles for which the corresponding Transmit Token Empty Counter 212 and Receive Queue Full Counter 214 exceeded corresponding high/low threshold values and High Threshold Exceeded 218a and Low Threshold Exceeded 218b were high. At the end of Measurement Interval 308, the number of clock cycles or number of times each of High Threshold Exceeded 218a and Low Threshold Exceeded 218b were high can be compared to corresponding predefined maximum measurement interval exception thresholds. This comparison result can be forwarded to ring frequency controller 120. Ring frequency controller 120 can factor the comparison result into setting the index value and determining ring frequency increase/decrease.

Small differences in the order of a small number of clock cycles which may exist between the measurements intervals when synchronized to individual switch units will not lead to discrepancies in the above aspects, as the measurement interval may be defined or set to be of a sufficiently long duration which makes these minor differences insignificant.

In another aspect, Measurement Interval 308 may be reduced, for example, to one clock cycle. In other words, comparison of Transmit Tokens Empty Counter 212 and Receive Queue Full Counter 214 to threshold values may be made every clock cycle (rather than wait until the end of Measurement Interval 308 as previously described). Ring frequency controller 120 may be able to make decisions to increase/decrease bus ring frequency every clock cycle in this case. While this aspect may incur additional power consumption in comparisons being performed every clock cycle, the performance of bus ring 100 can be improved by closely monitoring each agent's requirements every cycle.

In another aspect, some agents may be connected to bus ring 100 through two or more interfaces or switch units. For example if agent 102, an L3 cache operates as a snooper or a point of serialization and a master for multiple memory mapped interleaves. Rather than having an independent performance monitoring apparatus for each interface, an aggregate of all these interfaces can share the same logic such as block 200 outlined above. In this manner exhaustive Transmit Tokens Empty and Receive Queue Full counts for all of the interfaces of the agent can be counted and the aggregate counts can be compared to the same or common Transmit Tokens Empty and Receive Queue Full counts for the interface. This aspect reduces hardware overhead by sharing the logic as outlined above, which also has the benefit of lower power consumption.

Figure 6:
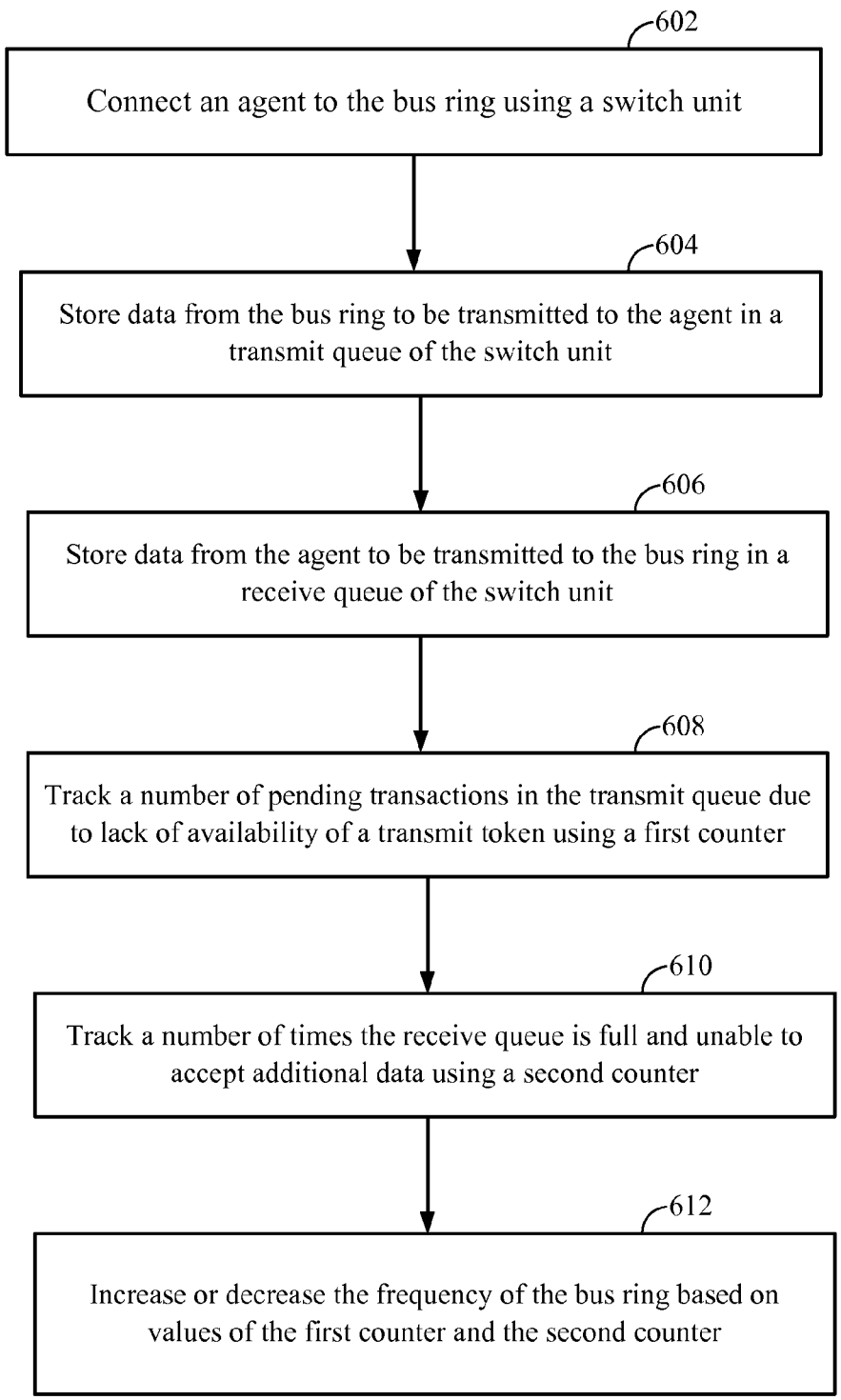
FIG. 6 illustrates a flow chart for another example method of increasing or decreasing bus ring frequency in a bus ring system according to disclosed aspects.

In addition to the above-described aspects, it will be appreciated that exemplary aspects can include various methods for performing the processes, functions, or algorithms disclosed herein. For example, as illustrated in FIG. 6, an exemplary aspect can include a method of adjusting frequency of a bus ring (e.g., 100), the method comprising: connecting an agent (e.g., 102/103/104) to the bus ring using a switch unit (e.g., 106)—Block 602; storing data from the bus ring to be transmitted to the agent in a transmit queue (e.g., R/T 112) of the switch unit—Block 604; storing data from the agent to be transmitted to the bus ring in a receive queue (e.g., R/T/112) of the switch unit—Block 606; tracking a number of pending transactions in the transmit queue due to lack of availability of a transmit token using a first counter (e.g., 212)—Block 608; tracking a number of times the receive queue is full and unable to accept additional data using a second counter (e.g., 214)—Block 610; and increasing or decreasing the frequency of the bus ring based on values of the first counter and the second counter—Block 612.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of this disclosure can include a computer readable media embodying a method for performance monitoring in a bus ring. Accordingly, exemplary aspects are not limited to illustrated examples and any means for performing the functionality described herein are included in embodiments of the invention. Moreover, one or more aspects of this disclosure can be integrated in a device selected from the group consisting of a set-top box, music player, video player, entertainment unit, navigation device, communications device, personal digital assistant (PDA), fixed location data unit, and a computer. Further, aspects of this disclosure may be integrated in at least one semiconductor die.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An apparatus comprising:
   a bus ring;
   an agent;
   a switch unit configured to connect the agent to the bus ring, wherein the switch unit comprises:
      a transmit queue to store data from the bus ring to be transmitted to the agent;
      a receive queue to store data from the agent to be transmitted to the bus ring;
      a first counter to track a number of pending transactions in the transmit queue due to lack of availability of a transmit token; and
      a second counter to track a number of times the receive queue is full and unable to accept additional data;
   wherein a frequency of the bus ring is configured to be increased or decreased based on values of the first counter and the second counter.

2. The apparatus of claim 1, further comprising a controller configured to provide an index value to the switch unit based on a desired performance level for a current measurement interval, wherein the index value includes an indication of a first set comprising a duration of the current measurement interval, a first high threshold value and a first low threshold value for the first counter, and a second high threshold value and a second low threshold value for the second counter.

3. The apparatus of claim 2, wherein the desired performance level for the current measurement interval is based on comparisons of values of the first counter and the second counter with corresponding first and second high and low threshold values corresponding to a previous index value in a previous measurement interval.

4. The apparatus of claim 2, wherein the controller is configured to increase the frequency of the bus ring if a high threshold of the switch unit is exceeded, wherein the high threshold of the switch unit is exceeded if the value of the first counter is greater than the first high threshold value or if the value of the second counter is greater than the second high threshold value during the current measurement interval.

5. The apparatus of claim 4 comprising two or more switch units, wherein the controller is configured to increase the frequency of the bus ring if a high threshold of any one of the two or more switch units is exceeded.

6. The apparatus of claim 2, wherein the frequency of the bus ring is configured to be decreased if a low threshold of the switch unit is exceeded, wherein the low threshold of the switch unit is exceeded if the value of the first counter is less than the first low threshold value and if the value of the second counter is less than the second low threshold value during the current measurement interval.

7. The apparatus of claim 6 comprising two or more switch units, wherein the controller is configured to decrease the frequency of the bus ring if a low threshold of all of the two or more switch units is exceeded.

8. The apparatus of claim 2, comprising a multiplexor to select the first set from two or more sets based on the indication provided by the index value.

9. The apparatus of claim 2, wherein the controller is configured to disable determination of increase or decrease of the bus frequency based on the first and second counters of the switch unit during the current measurement interval for a predetermined value of the index value.

10. The apparatus of claim 2, wherein the bus ring frequency is synchronized to a local frequency of the switch unit.

11. The apparatus of claim 2, wherein the controller is configured to provide one or more transmit tokens to the switch unit.

12. The apparatus of claim 1, wherein the agent is a processor, a cache, a bridge unit, a direct memory access (DMA) controller, or a memory controller.

13. The apparatus of claim 1 integrated in at least one semiconductor die.

14. The apparatus of claim 1, integrated in a device selected from the group consisting of a set-top box, music player, video player, entertainment unit, navigation device, communications device, personal digital assistant (PDA), fixed location data unit, and a computer.

15. A method of adjusting frequency of a bus ring, the method comprising:
   connecting an agent to the bus ring using a switch unit;
   storing data from the bus ring to be transmitted to the agent in a transmit queue of the switch unit;
   storing data from the agent to be transmitted to the bus ring in a receive queue of the switch unit;
   tracking a number of pending transactions in the transmit queue due to lack of availability of a transmit token using a first counter;
   tracking a number of times the receive queue is full and unable to accept additional data using a second counter; and
   increasing or decreasing the frequency of the bus ring based on values of the first counter and the second counter.

16. The method of claim 15, further comprising receiving an index value at the switch unit from a controller, the index value based on a desired performance level for a current measurement interval, wherein the index value includes an indication of a first set comprising a duration of the current measurement interval, a first high threshold value and a first low threshold value for the first counter, and a second high threshold value and a second low threshold value for the second counter.

17. The method of claim 16, wherein the desired performance level for the current measurement interval is based on comparisons of values of the first counter and the second counter with corresponding first and second high and low threshold values corresponding to a previous index value in a previous measurement interval.

18. The method of claim 16, comprising increasing the frequency of the bus ring if a high threshold of the switch unit is exceeded, wherein the high threshold of the switch unit is exceeded if the value of the first counter is greater than the first high threshold value or if the value of the second counter is greater than the second high threshold value during the current measurement interval.

19. The method of claim 18 further increasing the frequency of the bus ring if a high threshold of any one of two or more switch units connected to the bus ring is exceeded.

20. The method of claim 16, comprising decreasing the frequency of the bus ring if a low threshold of the switch unit is exceeded, wherein the low threshold of the switch unit is exceeded if the value of the first counter is less than the first low threshold value and if the value of the second counter is less than the second low threshold value during the current measurement interval.

21. The method of claim 20 further comprising decreasing the frequency of the bus ring if a low threshold of all of two or more switch units connected to the bus ring is exceeded.

22. The method of claim 16, comprising selecting the first set from two or more sets based on the indication provided by the index value.

23. The method of claim 16, comprising disabling determination of increasing or decreasing the bus frequency based on the first and second counters of the switch unit during the current measurement interval for a predetermined value of the index value.

24. The method of claim 16, comprising synchronizing the bus ring frequency to a local frequency of the switch unit.

25. A system comprising:
an agent connected to a bus ring using a switch unit;
first means for storing data from the bus ring to be transmitted to the agent in the switch unit;
second means for storing data from the agent to be transmitted to the bus ring in the switch unit;
a first means for tracking a number of pending transactions in the first means for storing;
a second means for tracking a number of times the second means is full; and
means for increasing or decreasing the frequency of the bus ring based on values of the first and second means for tracking.

26. The system of claim 25, further comprising an index value based on a desired performance level for a current measurement interval, wherein the index value includes an indication of a first set comprising a duration of the current measurement interval, a first high threshold value and a first low threshold value for the first means for tracking, and a second high threshold value and a second low threshold value for the second means for tracking.

27. The system of claim 26, comprising means for increasing the frequency of the bus ring if a high threshold of the switch unit is exceeded, wherein the high threshold of the switch unit is exceeded if the value of the first means for tracking is greater than the first high threshold value or if the value of the second means for tracking is greater than the second high threshold value during the current measurement interval.

28. The system of claim 27 further means for increasing the frequency of the bus ring if a high threshold of any one of the two or more switch units of the bus ring is exceeded.

29. The system of claim 26, comprising means for decreasing the frequency of the bus ring if a low threshold of the switch unit is exceeded, wherein the low threshold of the switch unit is exceeded if the value of the first means for tracking is less than the first low threshold value and if the value of the second means for tracking is less than the second low threshold value during the current measurement interval.

30. The system of claim 29 further comprising means for decreasing the frequency of the bus ring if a low threshold of all of two or more switch units of the bus ring is exceeded.

* * * * *